(12) United States Patent
Joseph et al.

(10) Patent No.: US 6,966,003 B1
(45) Date of Patent: Nov. 15, 2005

(54) SYSTEM AND METHOD FOR SWITCHING SECURITY ASSOCIATIONS

(75) Inventors: Boby Joseph, Mt. Prospect, IL (US); Michael S. Borella, Naperville, IL (US); David A. Grabelsky, Skokie, IL (US)

(73) Assignee: 3Com Corporation, Marlborough, MA (US)

( * ) Notice: Subject to any disclaimer, the term of this patent is extended or adjusted under 35 U.S.C. 154(b) by 833 days.

(21) Appl. No.: 09/760,434

(22) Filed: Jan. 12, 2001

(51) Int. Cl.$^7$ .......................... H04L 9/00; G06F 15/16; G06F 11/00
(52) U.S. Cl. .......................... 713/201; 709/228; 714/4; 370/216
(58) Field of Search .............................. 713/200–202, 713/150–152, 160, 161; 709/249, 228, 221, 709/227–229; 714/4; 370/216–221, 225, 370/254

(56) References Cited

U.S. PATENT DOCUMENTS

| | | | | |
|---|---|---|---|---|
| 5,151,899 A | * | 9/1992 | Thomas et al. | 370/394 |
| 5,473,599 A | * | 12/1995 | Li et al. | 370/219 |
| 5,920,705 A | | 7/1999 | Lyon et al. | |
| 6,006,259 A | * | 12/1999 | Adelman et al. | 709/223 |
| 6,055,236 A | * | 4/2000 | Nessett et al. | 370/389 |
| 6,275,860 B1 | * | 8/2001 | DeForest et al. | 709/230 |
| 6,330,602 B1 | * | 12/2001 | Law et al. | 709/224 |
| 6,438,612 B1 | * | 8/2002 | Ylonen et al. | 709/249 |
| 6,674,713 B1 | * | 1/2004 | Berg et al. | 370/217 |
| 2001/0056503 A1 | * | 12/2001 | Hibbard | 709/250 |

FOREIGN PATENT DOCUMENTS

| | | | | | |
|---|---|---|---|---|---|
| JP | 2003115834 A | * | 4/2003 | | H04L 9/08 |
| WO | WO 2000062507 A1 | * | 10/2000 | | H04L 29/06 |

OTHER PUBLICATIONS

International Telecommunication Union (ITU-T) Recommendation H.323, "Packet-based multimedia communications systems", Feb. 1998, pp. 1-115.

S. Kent and R. Atkinson, Internet Engineering Task Force ("IETF"), Request for Comments ("RFC") RFC-2402, "IP Authentication Header," Nov. 1998, pp. 1-22.

Schulzrinne, et al., Internet Engineering Task Force ("IETF"), Request for Comments ("RFC") RFC-1889, "RTP: A Transport Protocol for Real-Time Applications," Jan. 1996, pp. 1-75.

(Continued)

Primary Examiner—Christopher Revak
(74) Attorney, Agent, or Firm—McDonnell Boehnen Hulbert & Berghoff LLP

(57) ABSTRACT

A system and method for switching security associations between network devices. The system and method includes a first, a second, and a third network device, with a first secure communication being established between the first and second network devices, and a second secure communication being established between the first and third network devices. Both secure communications may have replay prevention enabled. In addition, the first secure communication has a security association and a pre-defined sequence number limit less than a maximum sequence number, while the second secure communication has the same security association as the first secure communication, but an initial sequence number greater than the pre-defined sequence number limit. The system and method may also have a fourth network device with security information corresponding to the security association. The fourth network device is capable of passing the security information from the first network device to the third network device.

26 Claims, 9 Drawing Sheets

OTHER PUBLICATIONS

S. Kent and R. Atkinson, Internet Engineering Task Force ("IETF"), Request for Comments ("RFC") RFC-2406, "IP Encapsulating Security Payload (ESP)." Nov. 1998, pp. 1-22.

D. Harkins and D. Carrel, Internet Engineering Task Force ("IETF"), Request for Comments ("RFC") RFC-2409, "The Internet Key Exchange (IKE)," Nov. 1998, pp. 1-41.

Handley, et al., Internet Engineering Task Force ("IETF"), Request for Comments ("RFC") RFC-2543, "SIP: Session Initiation Protocol," Mar. 1999, pp. 1-153.

Arango, et al., Internet Engineering Task Force ("IETF"), Request for Comments ("RFC") RFC-2705, "Media Gateway Control Protocol (MGCP), Version 1.0," Oct. 1999, pp. 1-134.

* cited by examiner

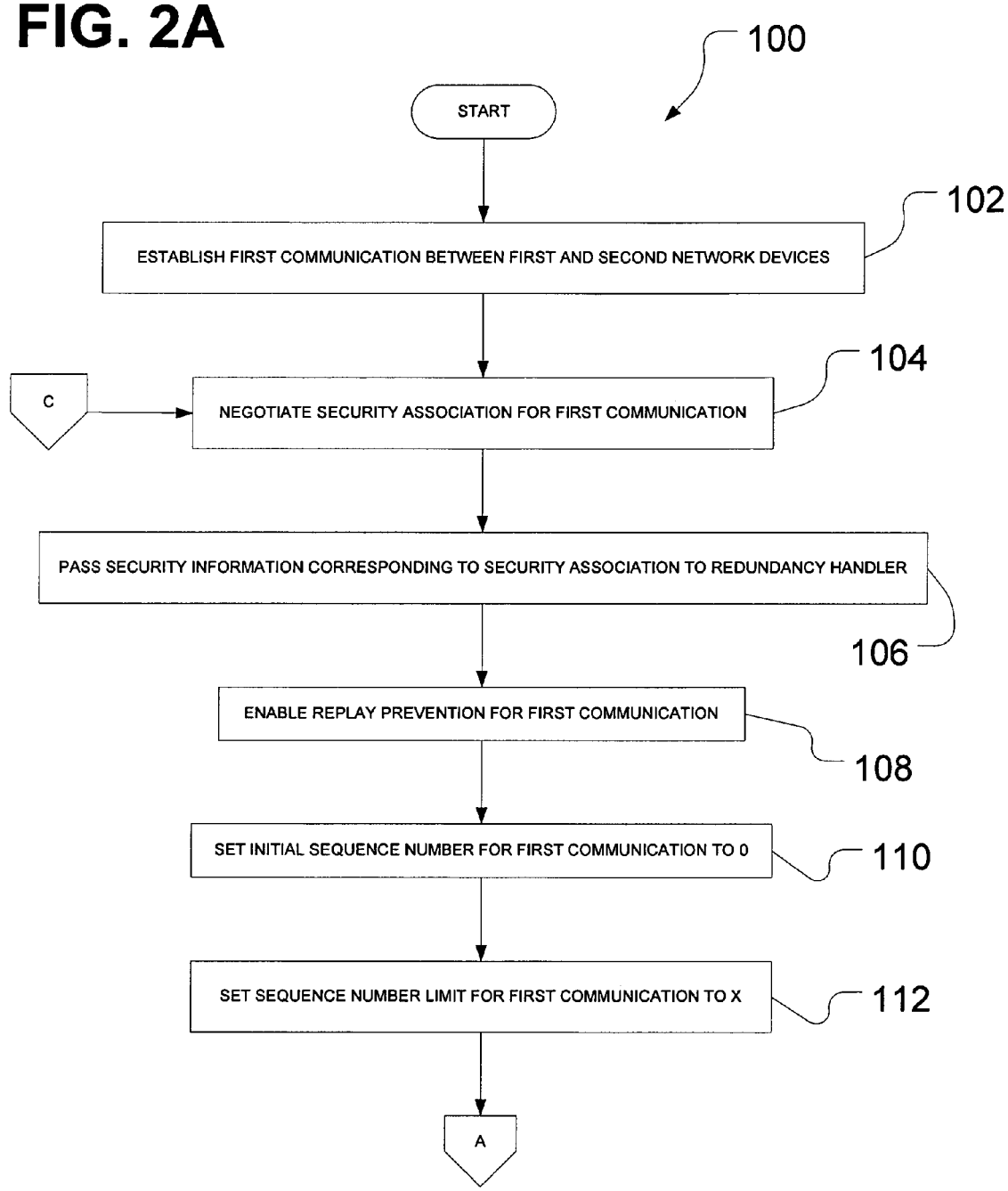

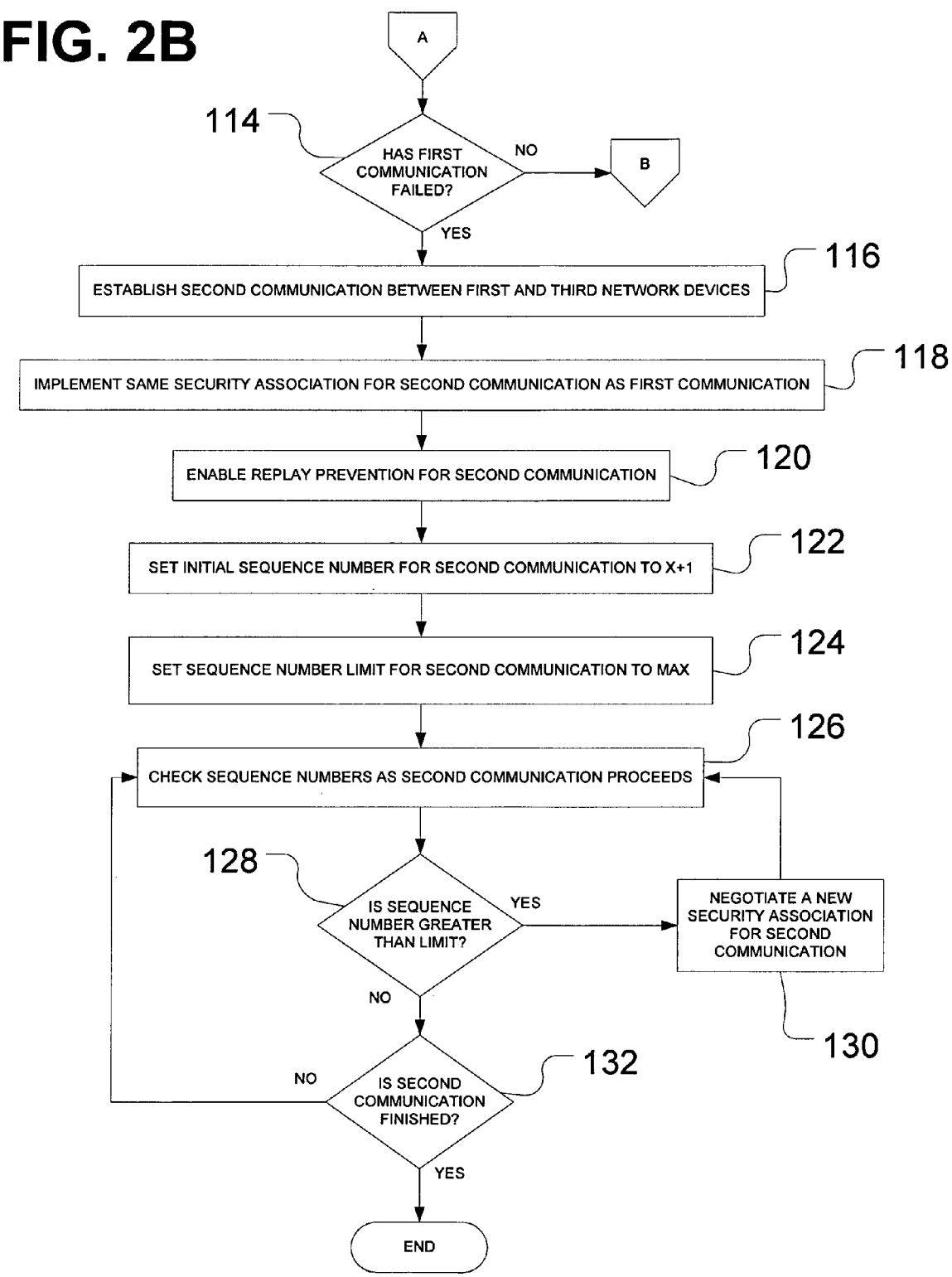

SYSTEM AND METHOD FOR SWITCHING SECURITY ASSOCIATIONS

FIELD OF INVENTION

This invention relates to computer networks and network security. More specifically, it relates to a system and method for switching security associations between different network devices.

BACKGROUND OF THE INVENTION

Internet Protocol (IP) is an addressing protocol designed to facilitate the routing of traffic within a network or between networks. IP is used on many computer networks including the Internet, intranets and other networks. IP may also be used for voice calls transmitted over one or more of these networks. Since communications on these computer networks (especially voice calls) may involve personal and confidential information (e.g., credit cards numbers), it may be desirable to utilize security features, such as authentication and encryption, to protect any personal and confidential information. A whole suite of protocols for implementing such security, known as IP security (IPSEC), has been defined by the Internet Engineering Task Force (IETF). For more information on IPSEC, see IETF Requests For Comments (RFC) 2401–2412, all of which are specifically incorporated herein by reference.

In order to establish a secure communication with IPSEC, a security association (SA) may be negotiated and set up between two network devices. The SA typically involves/includes information such as key lifetime, encryption algorithm, authentication algorithm, etc. For more information on SAs, see RFC 2409, which is specifically incorporated herein by reference. In addition to establishing an SA, the two network devices may enable replay prevention to provide further security for their communication. Replay prevention is an IPSEC implementation that is typically used to prevent other network devices (e.g., "man in the middle") from copying and "replaying" packets being sent between two network devices. For more information on replay prevention, see RFCs 2402 and 2406, which are specifically incorporated herein by reference. Replay prevention usually involves the use of a replay counter to generate and keep track of sequence numbers assigned to packets being sent back and forth between two network devices. Sequence numbers are updated with each new packet that is sent, an in large network systems, thousands of new packets are sent each second.

During a secure communication, there may come a time when one of the network devices wants or needs to turn over the secure communication to another network device. For example, one of the network devices may become inoperable or "crash" due to a hardware or software error. The failing network device may then wish to transfer its secure communication over to another network device, such as a back-up or redundant network device. In doing so, the SA between the original two network devices should be transparently transferred over to the new network device (e.g., the back-up or redundant network device) in order to obviate the need to break up the communication while a new SA is negotiated.

Switching an established SA between two network devices can be difficult, however, if replay prevention has been enabled for the secure communication. In such a case, sequence number information must be recorded separately by the back-up or redundant network device. Updating and maintaining the sequence number information for switching over the secure communication to the back-up or redundant network device is not scalable, especially since there may be thousands of packets being transmitted every second, and sequence numbers are updated per each new packet. Indeed, updating and maintaining the sequence number information on a per-packet basis results in valuable network resources, such as processing time and bandwidth, being wasted. In addition, if the back-up or redundant network device serves more than one network device, it may also be difficult for the back-up or redundant network device to maintain and update sequence number information for multiple network devices.

Accordingly, it is desirable to have a system and method for switching SAs between network devices that does not waste network resources, reduce performance of the system, or degrade the quality of the communication between the network devices, even when replay prevention is enabled. The present invention provides such a system and method for switching SAs.

SUMMARY OF THE INVENTION

The present application provides a network system for switching security associations comprising a first, a second, and a third network device. The network system of the present invention further comprises a first secure communication between the first and second network devices, and a second secure communication between the first and third network devices. Both secure communications may have replay prevention enabled. In addition, the first secure communication has a security association and a pre-defined sequence number limit less than a maximum sequence number, while the second secure communication has the same security association as the first secure communication, but an initial sequence number greater than the pre-defined sequence number limit. The network system of the present invention may also have a fourth network device with security information corresponding to the security association. The fourth network device is capable of passing the security information from the first network device to the third network device.

The present application provides a method for switching security associations between network devices. The method of the present invention comprises the steps of establishing a first communication between a first network device and a second network device, negotiating a security association for the first communication, and using a pre-defined sequence number limit less than a maximum sequence number for the first communication. The method of the present invention further comprises the step of replacing the first communication with a second communication between the first network device and a third network device. The method of the present invention may also comprise the steps of passing security information corresponding to the security association from the first network device to the third network device, implementing the same security association for the second communication as the first communication, and using an initial sequence number greater than the pre-defined sequence number limit for the second communication.

BRIEF DESCRIPTION OF THE DRAWINGS

FIGS. 2A–2C are a flow diagram illustrating an exemplary operation of the network system of FIG. 1, as well as an exemplary method of the present invention for switching security associations between devices in a network system.

DETAILED DESCRIPTION OF PREFERRED EMBODIMENTS

Figure 1:
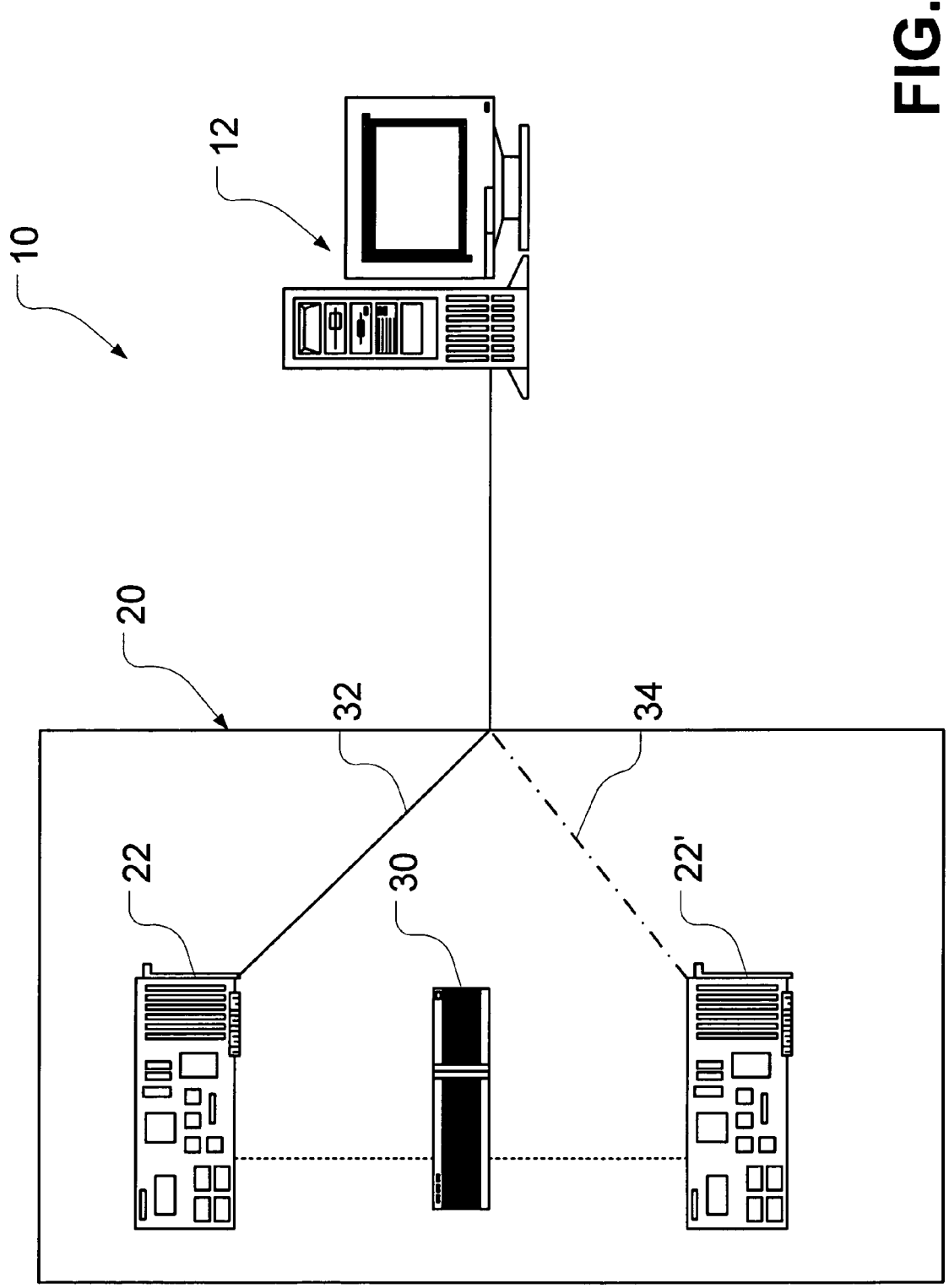
FIG. 1 is a block diagram illustrating an exemplary network system of the present invention for switching security associations between network devices.

Turning now to the drawings, FIG. 1 shows a preferred embodiment of a network system 10 for switching SAs between different network devices. The network system 10 comprises a first network device 12, which may be a personal computer or workstation, and a network subsystem 20 that is in communication with the first network device 12. As shown in FIG. 1, the network subsystem 20 comprises a second network device 22 and a third network device 22'. Preferably, only one of these second and third network devices 22, 21' is in communication with the first network device 12 at any given time, as indicated by the dashed line in FIG. 1. In other words, the third network device 22' is preferably a standby or back-up device for the second network device 22. The second and third network devices 22, 22' may be any number of network devices, such as personal computers or workstations, media gateways, blades, or line cards.

The network subsystem 20 may also comprise a fourth network device 30 that is in communication with both the second and third network devices 22, 22'. The fourth network device 30 may be any number of network devices, such as a redundancy handler, a router (or router card), a media gateway controller, and/or a server. For more information on media gateways and media gateway controllers, see the Media Gateway Control Protocol ("MGCP"), RFC 2075, which is specifically incorporated herein by reference. Preferably, the fourth network device 30 records and stores data information, especially security information corresponding to SAs, for the second and third network devices 22, 22'. In such an arrangement, the fourth network device 30 is able to record security information pertaining to an SA negotiated by one of the network devices (e.g., the second network device 22), and pass the security information along to another network device (e.g., the third network device 22'). It should be understood that while depicted as a separate component in FIG. 1, the fourth network device 30 may be integrated into one, or both, of the second and third network devices 22, 22'. It should also be understood that the network subsystem 20 may comprise more or less than the three network devices shown in FIG. 1.

Figure 2C:
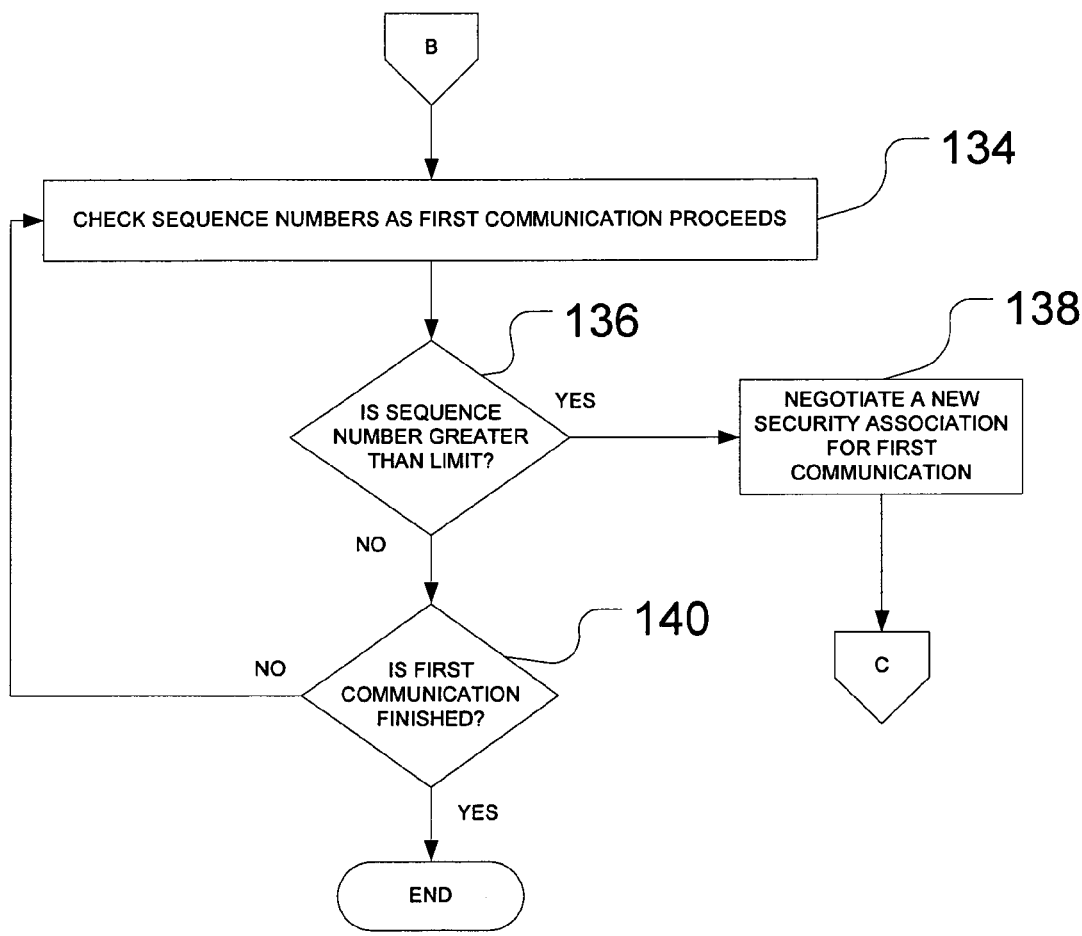

FIGS. 2a–2c show the operation of the network system 10, as well as a preferred method 100 for switching SAs between the network devices of this network system. As shown in FIG. 2a, the method 100 begins with a first communication 32 (see FIG. 1) being established between the first network device 12 and the second network device 22 of the network subsystem 20 (step 102). In step 104, an SA for the first communication is also negotiated by the first and second network devices 12, 22. Alternatively, the SA for the first communication may be negotiated by the first and fourth network devices 12, 30. Next, in step 106, security information corresponding to the negotiated SA for the first communication is passed along to the fourth network device 30 (e.g., a redundancy handler). Preferably, the fourth network device 30 stores such security information for the benefit of the third network device 22'. Alternatively, the fourth network device may immediately send the security information to the third network device 22'.

The method 100 continues with step 108, wherein replay prevention is enabled for the first communication 32. As well-known in the art, replay prevention is implemented through the use of replay counters at each network device involved with a communication. For example, the first and second network devices may each use a 32-bit replay counter to mark and keep track of each new message packet that is being sent. For more information on replay prevention, see RFCs 2402 and 2406, which are specifically incorporated herein by reference. As shown in FIG. 2a, the initial sequence number for each replay counter used in the first communication is initially set to 0 (step 110). For each new message packet that is sent by a network device (e.g., the first and second network devices 12, 22), the replay counter's sequence number is incremented by 1. When replay prevention is enabled for a communication, such as the first communication 32, duplicate message packets (or message packets with sequence numbers less than the sequence number of a replay counter) received by a network device are preferably silently discarded.

Each replay counter preferably has a sequence number limit or maximum value. Once a replay counter reaches its sequence number limit or maximum value, a new SA must be negotiated to continue the communication between the network devices. This design is due to the fact that use of the same replay counter value within a communication opens that communication to a reply attack (i.e., an attacker may record the first packet sent with a replay counter of m, and then replay that packet when a recipient is expecting a second packet with a replay counter of m). By enabling replay protection for a given communication, such replay attacks are prevented and liveness is ensured for the communication.

As shown in FIG. 2a, the sequence number limit for the first communication is preferably set to X in step 112. With respect to the sequence number limit, X may be any sequence number less than a maximum value. For example, if a 32-bit replay counter is used with the first communication, the maximum sequence number in hexadecimal may be FFFFFFFF. Consequently, the sequence number limit for the first communication 32 (i.e., X) may be set to FFFFF000. Preferably, but not necessarily, the predefined limit for sequence numbers in the first communication 32 is approximately 80% of the maximum sequence number value. It should be understood, however, that this predefined limit for sequence numbers for the first communication may be any number of different values less than the maximum sequence number value, depending on network preferences.

As shown in FIG. 2b, the method 100 continues with step 114. In step 114, a determination is made as to whether the first communication 32 has failed. Such failure may occur as a result of a hardware and/or software error involving a network device, such as the second network device 22. If the first communication has failed, then a second communication 34 (see FIG. 1) between the first and third network devices 12, 22' is established in step 116. Preferably, the same SA that was used for the first communication 32 is implemented for the second communication 34 in step 118.

Similar to the first communication 32, in step 120, replay prevention is preferably enabled for the second communication 34.

The method 100 continues with step 122, wherein the initial sequence number of the second communication is set to one more than the sequence limit for the first communication, i.e., X+1. Setting the initial sequence number for the second communication to X+1 ensures that message packets of the second communication will have sequence numbers greater than any sequence number used with message packets of the first communication. As a result of this arrangement, the transition from the first communication to the second communication will occur transparently and without any unnecessary delay, especially since anew SA will not have to be negotiated. In addition, the protection offered by replay prevention will be maintained for both the first and second communications despite the transition between them.

As with the first communication, the second communication preferably has a sequence number limit to ensure liveness of the communication and its message packets. As shown in FIG. 2b, the sequence number limit of the second communication may be set to a maximum sequence number value, MAX, in step 124. For example, if 32-bit replay counters are used for the second communication, the maximum sequence number value, MAX, may be represented in hexadecimal as FFFFFFFF.

As the second communication proceeds, the sequence numbers for each message packet are checked by the first and third network devices in step 126. More specifically, in step 128, a determination is made as to whether a given sequence number is greater than the sequence number limit set in step 124. If the sequence number of a message packet is greater than such limit, then a new SA for the second communication is negotiated in step 130. On the other hand, if the sequence number of a given message packet is not greater than the sequence number limit set in step 124, then a further determination as to whether the second communication is finished is made in step 132. If the second communication is not finished, then the method 100 continues to check sequence numbers in step 126 as the second communication proceeds. If the second communication is finished, however, then the method 100 ends, as shown in FIG. 2b.

Returning to step 114 of the method 100, if the first communication has not failed, then the sequence numbers of the message packets for the first communication are checked in step 134 (see FIG. 2c) by the first and second network devices as the first communication proceeds. As shown in FIG. 2c, a determination is also made in step 136 as to whether the sequence number of a given message packet for the first communication is greater than the sequence number limit set for the first communication in step 112 (i.e., X). If the sequence number is greater than such limit (i.e., X), then a new SA is negotiated for the first communication in step 138, and the method 100 returns to step 104. On the other hand, if the sequence number is not greater than the sequence number limit set in step 112, then a further determination is made in step 140 as to whether the first communication is finished. If the first communication is not finished, then the method 100 continues with step 134. If the first communication is finished, however, then the method 100 ends, as shown in FIG. 2c.

Figure 3:
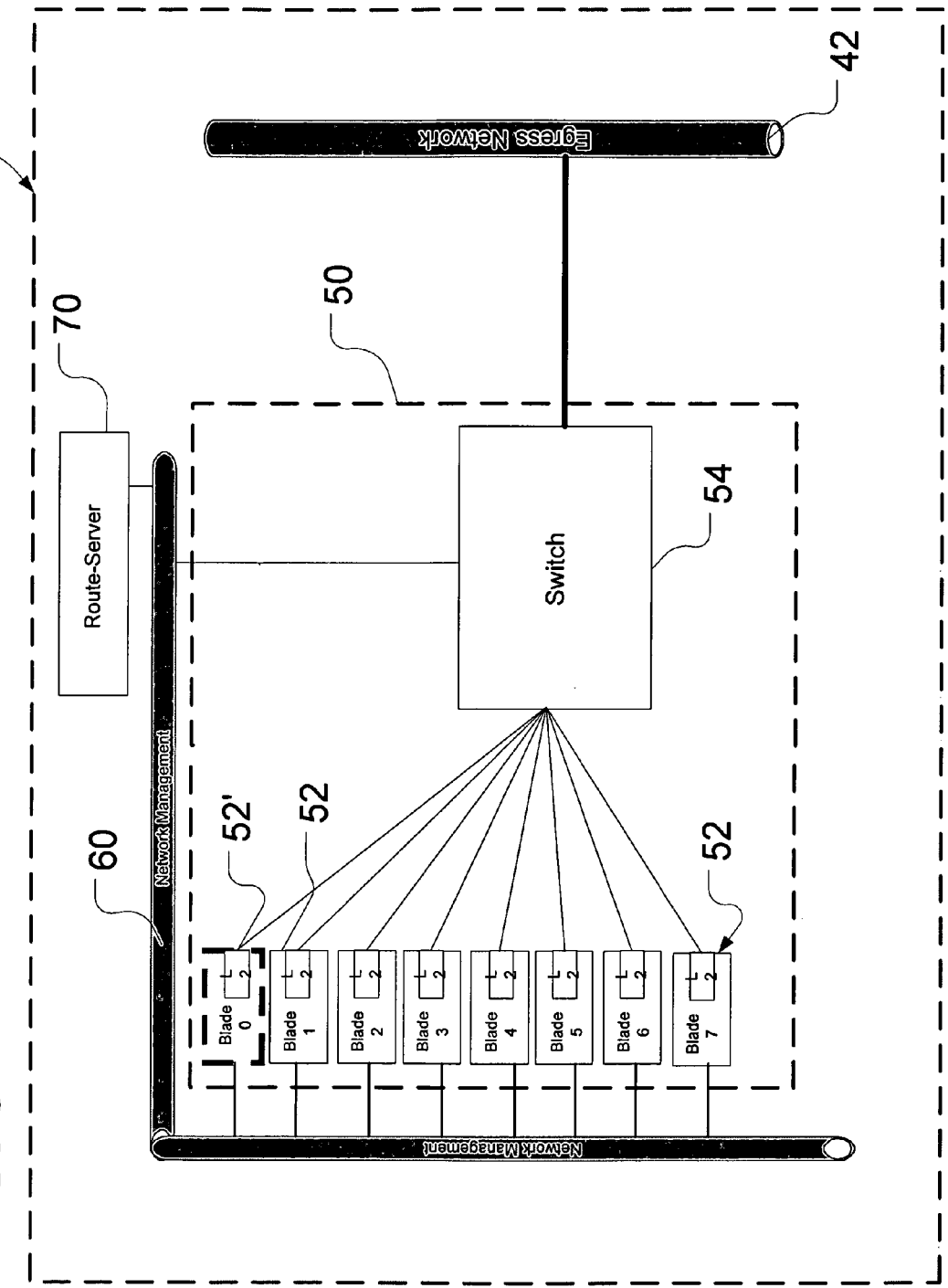
FIG. 3 is a block diagram illustrating an exemplary voice call system of the present invention that implements the system and method of FIGS. 1 and 2A–2C, respectively.

FIG. 3 illustrates an exemplary embodiment of a voice call system 40 that implements the above system and method of the present invention. The voice call system 40 comprises an egress network 42 and a blade network 50 in communication with the egress network 42. Although not shown, the egress network 42 may comprise any number of different network devices, such as personal computers, smart phones, cellular phones, and fax machines. As shown in FIG. 3, the blade network 50 comprises a plurality of blades 52 that are in communication with the egress network 42 via a switch 54. Each blade may also be connected to and in communication with a network management system 60, which in turn may control the blades and maintain their state information. The blade network 50 may further comprise a route-server 70 that is coupled to and in communication with the blades 52 and the switch 54 via the network management 60. It should be understood, however, that the route-server 70 may be connected directly to the blades 52 and/or the switch 54 without involving the network management system 60.

As shown in FIG. 3, the blade network 50 preferably comprises eight blades 52, which are numbered 0 through 7. It should be understood, however, that while eight 8 blades are shown in FIG. 3, any number of blades may be used with the blade network 50 of the present invention. For example, eleven blades may be used for the blade network 50. Preferably, but not necessarily, blades 1 through 7 are active blades, while blade 0 is an inactive or standby blade. Once again, it should be understood that there may be more or fewer active and/or standby blades. For example, in the eight blades shown in FIG. 3, four of the blades may be active and the remaining four blades may be standby. Alternatively, if eleven blades are used for the blade network 50, ten of the blades may be active, while one of the blades may be a standby.

The switch 54 may be any number of different types of switches or switch fabrics, depending upon network preferences. Preferably, the switch 54 includes a network processor, a strata switch, and an external network interface (or other similar components).

The route-server 70 may be any number of different network devices, such as a router, media gateway controller, redundancy handler, personal computer workstation, or a server. In one preferred embodiment of the present invention, the switch 54 operates as a datalink layer (layer 2 of the OSI reference model) packet-forwarding device that directs message traffic to its respective blade 52 based upon an assigned security parameter index (SPI). In such an embodiment, each blade 52 operates as a distributed host along with the route-server 70. Preferably, IPSEC functions are controlled by the route server 70, which runs the IKE protocol and negotiates the SAs for each blade 52. After creating an SA, the route-server 70 passes a copy of the security information corresponding to the SA to the appropriate blade 52. In addition, the SPI information resulting from the negotiated SA is passed by the route-server 70 to the switch 54. As a result, the switch is able to route message packets containing an SPI to the appropriate blade. It should be understood that other configuration parameters (e.g., IP addresses) may be passed to the blades and/or switch.

While the above discussion and FIG. 3 describe layer 2 switching being performed by the switch 54, as well as the router-server 70 controlling the IPSEC functions and running the IKE protocol, it should be understood that other arrangements or configurations may be used with the present invention, depending upon network preferences. For example, each blade 52 may operate as independent host, and control its own IPSEC functions instead of having the route-server 70 control such functions. In such an arrangement, the IKE protocol will run on the blade 52 itself, and each blade will negotiate its own SA and SPI. After creating its SA, each blade will pass a copy of the security information (including the SPI) corresponding to its SA to the route-server 70, which may then in turn forward any SPI to the switch 54.

As yet another example of a different arrangement and configuration, the switch 54 may operate as a network-layer (layer 3 of the OSI reference model) IP packet forwarding device. In such an embodiment, the switch 54 may route message traffic to the individual blades 52 based on each blade's IP address and/or SPI. The SPI negotiated by each blade may be passed along by the blade either directly to the switch 54 or indirectly to the switch 54 via the route server 70.

Figure 4:
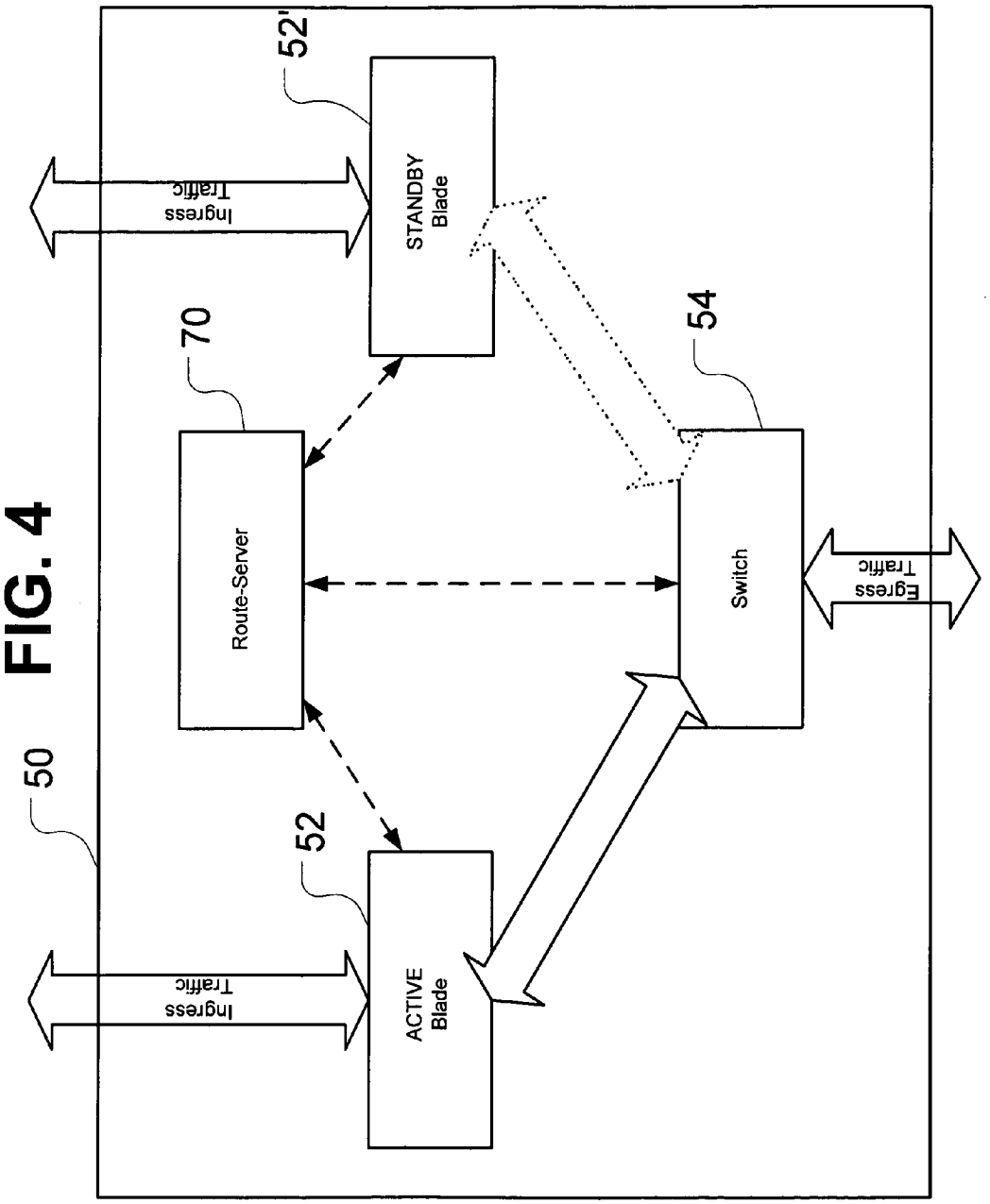
FIG. 4 is a block diagram illustrating traffic control within the voice call system of FIG. 3.

FIG. 4 shows a block diagram of traffic control within the voice call system 40 described above and shown in FIG. 3. For ease of reference and illustration, only one active blade 52 and one standby blade 52' are shown in FIG. 4. As noted above, however, it should be understood that multiple active and standby blades may be used with the voice call system 40 of the present invention. As shown in FIG. 4, egress traffic from the egress network 42 enters the switch 54 of the blade network 50. The switch directs the egress traffic to the active blade 52 based on the SPI contained in the message packets of such traffic and previously assigned to the active blade during negotiation of the SA for the active blade. The active blade 52 may then in turn pass along any message traffic to an ingress network (not shown).

As shown in FIG. 4, the route-server 70 is in communication with the switch 54 and the active and standby blade 52, 52'. As explained in more detail above, the route-server 70 preferably runs the IKE protocol and negotiates the SA for the active blade 52, and also passes security information corresponding to the negotiated SA to the active blade 52 and the SPI to the switch 54. The route-server 70 also passes a copy of the security information corresponding to the SA negotiated for active blade 52 along to the standby blade 52' in the case of a failure of the active blade 52.

If the active blade 52 fails (e.g., due to a hardware or software error), the switch 54 redirects any egress traffic to the standby blade 52', as shown in FIG. 4. As noted above, the standby blade 52' has a copy of the security information corresponding to the SA used by the active blade 52, and has also been assigned the same SPI as the active blade 52. As a result, the switch 54 knows that message packets with the SPI that was used for the active blade 52 should now be passed to the standby blade 52'. As shown in FIG. 4, the standby blade 52 may then pass on any message traffic to the ingress network (not shown).

Figure 5A:
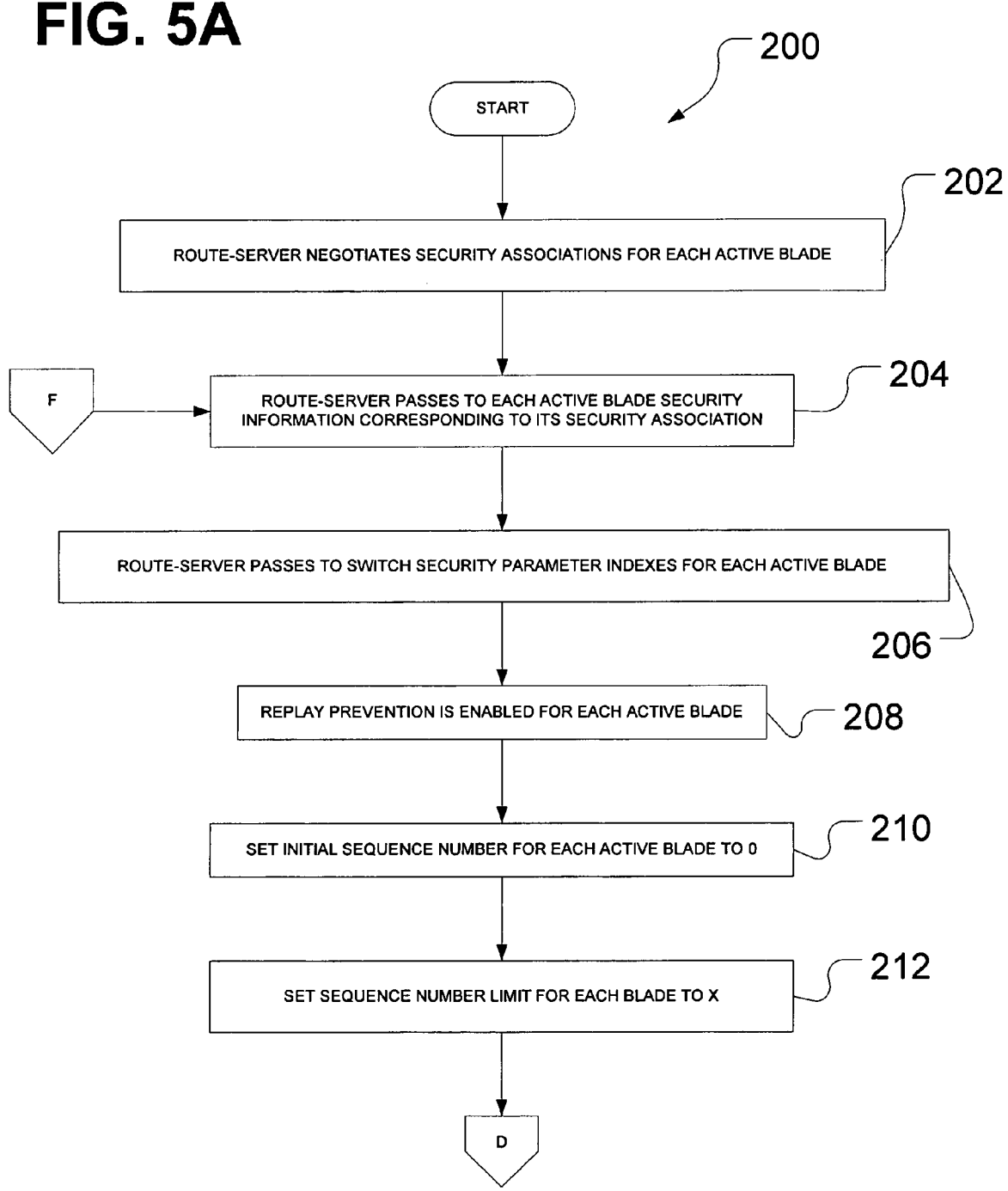
FIGS. 5A–5C are a flow diagram illustrating an exemplary operation of the voice call system of FIG. 3, as well as an exemplary method of the present invention for switching security associations between devices in a voice call system.
Figure 5B:
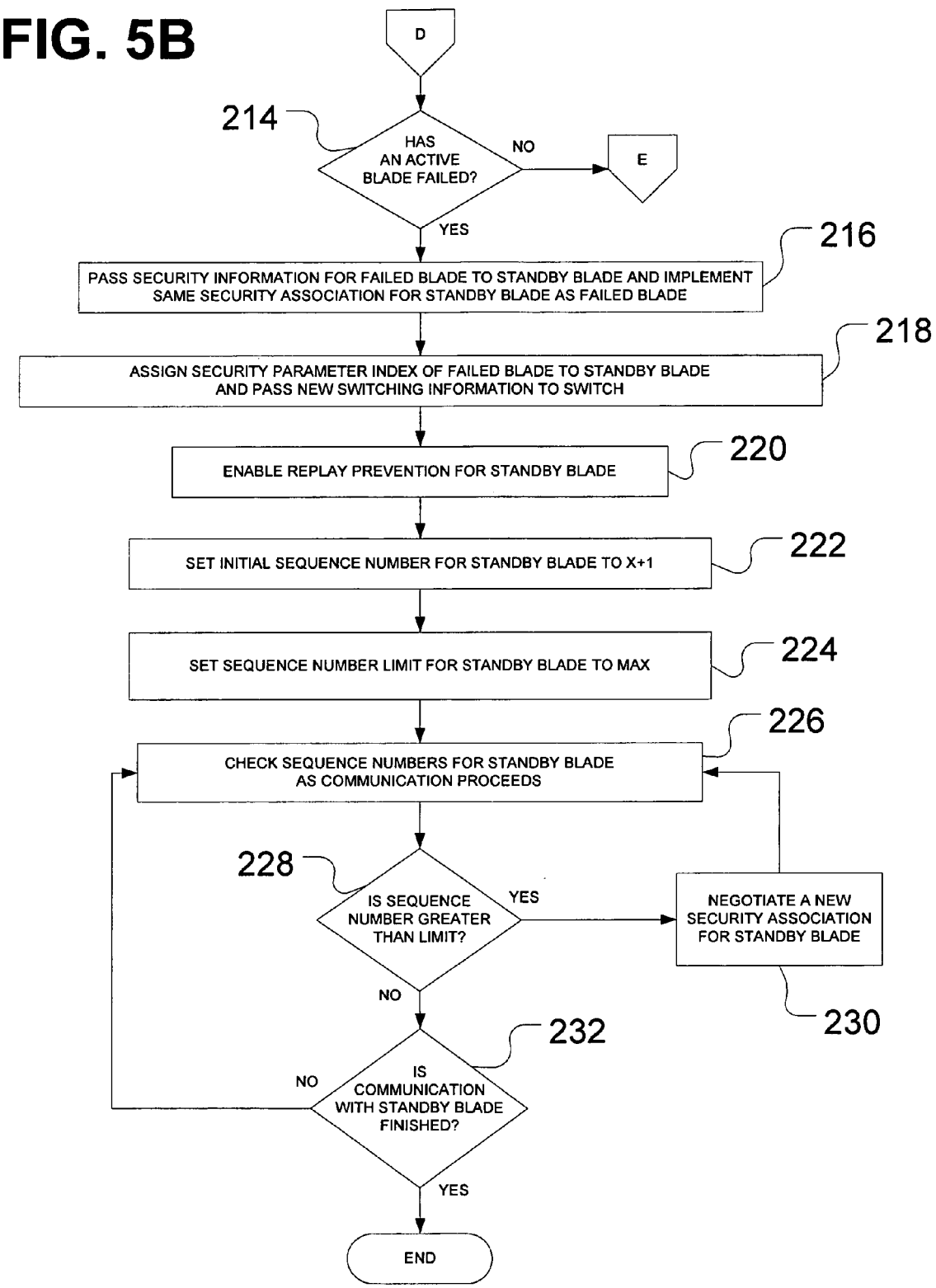
Figure 5C:
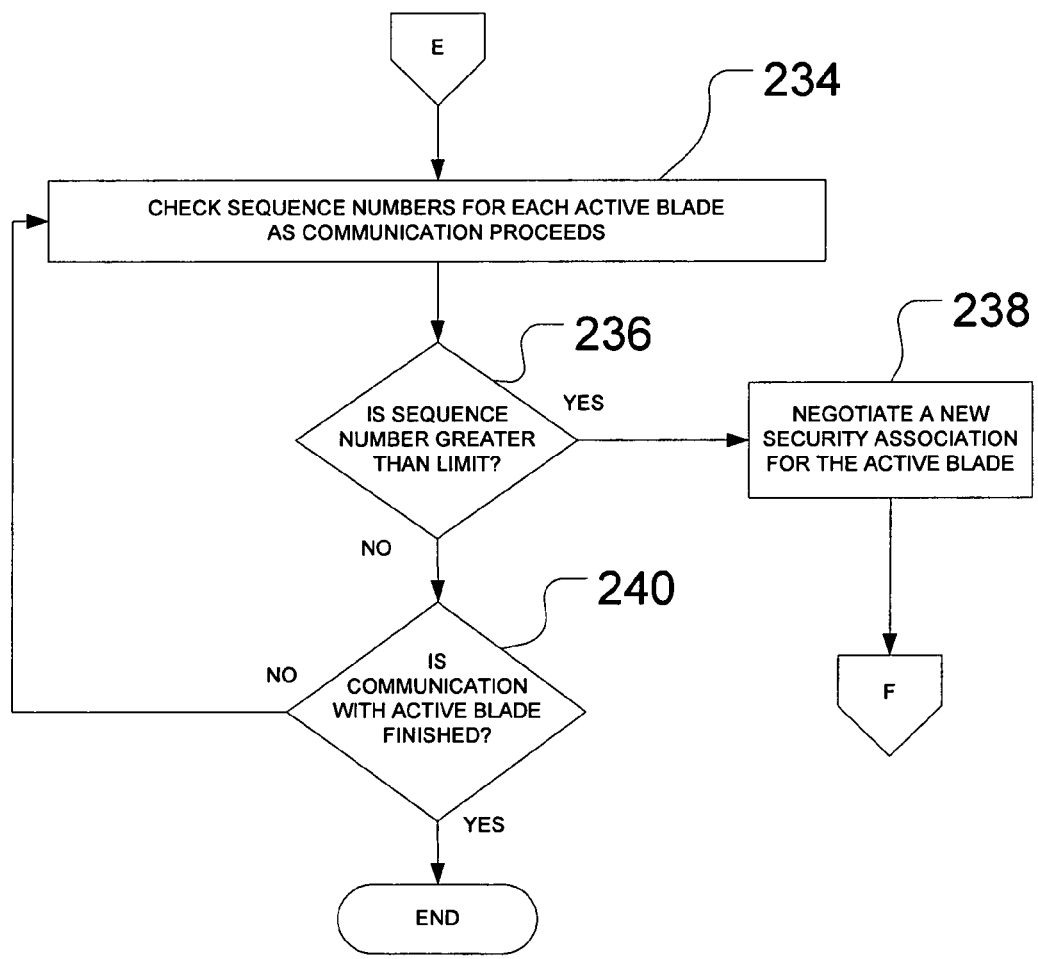

FIGS. 5a–5c illustrate in more detail the operation of the voice call system 40 described above and shown in FIG. 3. As shown in FIG. 5a, the method 200 of the present invention begins with step 202, wherein the route-server negotiates SAs for each active blade. In step 204, the route-server then passes security information corresponding to a negotiated SA along to each of the respective active blades. In addition, the route-server passes to the switch the SPIs resulting from the SA negotiation for each active blade. As a result, the switch can examine message packets for their SPIs, and route such packets to their appropriate active blade based on the SPI contained in the message packet.

Preferably, replay prevention is enabled for each active blade (step 208), and the initial sequence number for the replay counter for each active blade is set to 0 in step 210. Similar to the method 100, the sequence number limit for each active blade is set in step 212 to X, which is a value less than the maximum value for the sequence number limit of the negotiated SA and replay counter.

As shown in FIG. 5b, a determination is made in step 214 as to whether an active blade has failed. If an active blade has failed, then security information for the failed blade is passed in step 216 to the standby blade (e.g., blade 0), which implements the same SA that was used by the failed blade. As noted above, the security information may be passed from the failed blade to the standby blade by the route-server. Next, in step 218, the SPI of the failed blade is assigned by the route-server to the standby blade, and such new switching information is passed to the switch by the route-server as well. Preferably, like the active blades, replay prevention is enabled for the standby blade (step 220). As a result of replay prevention being enabled for the standby blade, the replay counter for the standby blade is set to an initial sequence number of X+1, which is a sequence number just greater than the sequence number limit, X, used by the active blade. Similarly, the sequence number limit for the SA and replay counter of the standby blade is set in step 224 to a maximum value, MAX.

In step 226, the sequence number of the message packets being sent to the standby blade are checked as communication between the egress network and the standby blade proceeds. In step 228, a determination is made as to whether any of the sequence numbers of the checked message packets is greater than the limit, MAX. If a checked sequence number is greater than the limit, then a new SA is negotiated for the standby blade in step 230, and the sequence numbers are once again checked in step 226. If the checked sequence number is not greater than the limit, MAX, then a further determination is made in step 232 as to whether the communication with the standby blade is finished. If the communication is finished, then the method 200 ends. Otherwise, the sequence numbers for the message packets received by the standby blade are continued to be checked in step 226.

Returning to step 214, if the active blade has not failed, then the sequence numbers of the message packets received by each active blade are checked in step 234 as the communication between the egress network and each active blade proceeds, (see FIG. 5c). Next, in step 236, a determination is made as to whether the checked sequence numbers are greater than the limit set in step 212 (i.e., X), as shown in FIG. 5c). If a sequence number is greater than the limit, X, then a new SA is negotiated for the active blade in step 238, and the method 200 returns to step 204 (see FIG. 5a). However, if the checked sequence number is not greater than the limit, X, then a further determination is made in step 240 as to whether the communication with the active blade is finished. If the communication is finished, then the method 200 ends, as shown in FIG. 5c. Otherwise, the communication proceeds with step 234.

The above-described network and method of the present invention may be used with any network that implements replay prevention and redundant or backup systems. The system and method of the present invention may be applied with particular advantage to networks that carry voice call traffic, especially Voice over IP ("VoIP") networks. For more information on VoIP, see International Telecommunications Union ("ITU") Recommendation H.323 and RFCs 1889 and 2543, all of which are specifically incorporated herein by reference. Such a network requires IPSEC protection, like replay prevention, to ensure secure voice communications, and also requires transparent switching between active and standby or backup systems without unnecessary interruptions. The system and method of the present invention allows voice networks to utilize IPSEC protection, including replay prevention, while also providing a voice network with transparent switching between active and standby network devices that is seamless and avoids unnecessary interruptions.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. In addition, with any of the previously described embodiments, security information corresponding to SAs may be passed directly to standby or backup devices/systems, and the standby devices may in turn sweep transmitted message packets in order to update their sequence number information and replay counters to match their corresponding active device/system. In such an arrangement, setting sequence number limits is unnecessary, as the standby device knows exactly which sequence number to start off with when a communication has been switched from the active device to the standby device. It should also be understood that while various elements of the preferred embodiments have been described as being implemented in software, hardware or firmware implementations may alternatively be used in other embodiments, and vice-versa.

The claims should not be read as limited to the described order or elements unless stated to that effect. Therefore, all embodiments that come within the scope and spirit of the following claims and equivalents thereto are claimed as the invention.

What is claimed is:

1. A network system for switching security associations comprising:
   a first network device;
   a second network device, the second network device being an active network device; and
   a third network device, the third network device being a standby network device;
   a first secure communication between the first and second network devices, the first secure communication having a security association and a pre-defined sequence number limit less than a maximum sequence number; and
   a second secure communication between the first and third network devices, the second secure communication having the same security association as the first secure communication without negotiating a different security association, the second secure communication also having an initial sequence number greater than the pre-defined sequence number limit.

2. The network system of claim 1 further comprising a fourth network device having security information corresponding to the security association, the fourth network device capable of passing the security information from the second network device to the third network device.

3. The network system of claim 2 wherein the security information comprises at least a security parameter index.

4. The network system of claim 2 wherein the fourth network device is a redundancy handler.

5. The network system of claim 2 wherein the fourth network device is a router.

6. The network system of claim 2 wherein the fourth network device is a media gateway controller, and the second and third network devices are media gateways.

7. The network system of claim 1 wherein the second and third network devices are blades.

8. The network system of claim 1 wherein the second secure communication replaces the first secure communication when the first secure communication fails.

9. The network system of claim 1 wherein replay prevention is enabled for both the first and second secure communications.

10. A network system for switching security associations comprising:
    a first network device:
    a second network device, the second network device being an active network device: and
    a third network device, the third network device being a standby network device;
    a first secure communication between the first and second network devices, the first secure communication having a security association and a pre-defined sequence number limit less than a maximum sequence number;
    a second secure communication between the first and third network devices, the second secure communication having the same security association as the first secure communication without negotiating a different security association, the second secure communication also having an initial sequence number greater than the pre-defined sequence number limit; and
    a fourth network device having security information corresponding to the security association, the fourth network device capable of passing the security information from the first network device to the third network device;
    wherein replay prevention is enabled for both the first and second secure communications.

11. The network system of claim 10 wherein the second secure communication replaces the first secure communication when the first secure communication fails.

12. The network system of claim 10 wherein the first and second secure communications are voice calls.

13. The network system of claim 10 wherein the security information comprises at least a security parameter index.

14. A method for switching security associations between network devices, the method comprising:
    establishing a first communication between a first network device and a second network device, the second network device being an active network device;
    negotiating a security association for the first communication;
    using a pre-defined sequence number limit less than a maximum sequence number for the first communication;
    replacing the first communication with a second communication between the first network device and a third network device, the third network device being a standby network device;
    implementing the same security association for the second communication as the first communication without negotiating a different security association; and
    using an initial sequence number greater than the pre-defined sequence number limit for the second communication.

15. The method of claim 14 further comprising passing security information corresponding to the security association from the first network device to the third network device.

16. The method of claim 15 further comprising providing at least a security parameter index for the security information.

17. The method of claim 15 further comprising storing the security information in a fourth network device.

18. The method of claim 14 further comprising replacing the first communication with the second communication when the first communication fails.

19. The method of claim 14 further comprising enabling replay prevention for both the first and second communications.

20. The method of claim 14 further comprising providing voice calls for the first and second communications.

21. The method of claim 14 further comprising providing blades for the second and third network devices.

22. A method for switching security associations between network dices, the method comprising:
   establishing a first communication between a first network device and a second network device, the second network device being an active network device;
   negotiating a security association for the first communication;
   using a pre-defined sequence number limit less tan a maximum sequence number for the first communication;
   replacing the first communication with a second communication between the first network device and a third network device, the third network device being a standby network device;
   passing security information corresponding to the security association from the first network device to the third network device;
   implementing the same security association for the second communication as the first communication without negotiating a different security association;
   using an initial sequence number greater than the pre-defined sequence number limit for the second communication.

23. The method of claim 22 further comprising providing at least a security parameter index for the security information.

24. The method of claim 22 further comprising replacing the first communication with the second communication when the first communication fails.

25. The method of claim 22 her comprising enabling replay prevention for both the first and second communications.

26. The method of claim 22 further comprising storing the security information in a fourth network device.

* * * * *